United States Patent
Kirk et al.

(10) Patent No.: US 9,083,534 B2
(45) Date of Patent: Jul. 14, 2015

(54) METHOD AND SYSTEM FOR PROPAGATING A CLIENT IDENTITY

(75) Inventors: Stephen Christopher Kirk, O'Fallon, MO (US); Nathaniel David Byrd, Saint Peters, MO (US); Eric G. Alger, Edwardsville, IL (US)

(73) Assignee: MasterCard International Incorporated, Purchase, NY (US)

( * ) Notice: Subject to any disclaimer, the term of this patent is extended or adjusted under 35 U.S.C. 154(b) by 92 days.

(21) Appl. No.: 13/335,496

(22) Filed: Dec. 22, 2011

(65) Prior Publication Data
US 2012/0179913 A1    Jul. 12, 2012

Related U.S. Application Data

(60) Provisional application No. 61/430,850, filed on Jan. 7, 2011.

(51) Int. Cl.
| H04L 9/32 | (2006.01) |
|---|---|
| G06F 21/00 | (2013.01) |
| G06F 21/10 | (2013.01) |
| H04L 29/06 | (2006.01) |

(52) U.S. Cl.
CPC .......... H04L 9/3247 (2013.01); H04L 63/0807 (2013.01); H04L 63/126 (2013.01); *G06F 21/10* (2013.01); *H04L 63/0823* (2013.01); *H04L 63/168* (2013.01); *H04L 63/20* (2013.01); *H04L 2209/56* (2013.01)

(58) Field of Classification Search
CPC combination set(s) only.
See application file for complete search history.

(56) References Cited

U.S. PATENT DOCUMENTS

| 5,355,484 | A | | 10/1994 | Record et al. |
|---|---|---|---|---|
| 6,002,871 | A | | 12/1999 | Duggan et al. |
| 6,005,942 | A | * | 12/1999 | Chan et al. ................... 713/187 |
| 6,085,321 | A | * | 7/2000 | Gibbs et al. .................. 713/170 |
| 6,115,744 | A | | 9/2000 | Robins et al. |
| 6,385,606 | B2 | | 5/2002 | Inohara et al. |

(Continued)

FOREIGN PATENT DOCUMENTS

WO        0225495 A1    3/2002

OTHER PUBLICATIONS

Kang, J., "IDB: Unified Query Interface for Information on the Web," University of Wisconsin-Madison, Oct. 22, 1999, www4.ncsu.edu/~jkang2/pubs/IDBMSproposal99.pdf (6 pages).

(Continued)

Primary Examiner — Azizul Choudhury
(74) Attorney, Agent, or Firm — Armstrong Teasdale LLP (57) ABSTRACT

A method and system for securely propagating client identities in a service call from a first system to a target service system are provided. The system includes a memory device for storing data and a service provider (SP) computer system. The SP computer system is programmed to determine identities to transmit to the target system in association with a request, construct a data structure to represent each identity and additional information related to the identity, digitally sign the identity information, pair the identity information and the corresponding digital signature in a header of a request message from the first system to the target service system, receive the request message and extract the identity information and corresponding digital signatures from the header, validate the corresponding digital signatures, and construct using the corresponding identity information a data structure that represents each of the original identities established in the first system.

32 Claims, 6 Drawing Sheets

(56) References Cited

U.S. PATENT DOCUMENTS

| | | | |
|---|---|---|---|
| 6,481,632 B2 | 11/2002 | Wentker et al. | |
| 6,560,581 B1 | 5/2003 | Fox et al. | |
| 6,567,828 B2 | 5/2003 | Inohara et al. | |
| 6,618,856 B2 | 9/2003 | Coburn et al. | |
| 6,741,992 B1 | 5/2004 | McFadden | |
| 7,003,661 B2 | 2/2006 | Beattie et al. | |
| 7,167,448 B2 | 1/2007 | Wookey et al. | |
| 7,213,235 B2 | 5/2007 | Ziv | |
| 7,308,491 B2 | 12/2007 | Gosewehr | |
| 7,383,231 B2 | 6/2008 | Gupta et al. | |
| 7,418,596 B1 | 8/2008 | Carroll et al. | |
| 7,426,737 B2 | 9/2008 | Hellenthal et al. | |
| 7,566,002 B2 | 7/2009 | Love et al. | |
| 7,647,493 B2 | 1/2010 | Bajko et al. | |
| 7,652,990 B2 | 1/2010 | Bryson | |
| 7,660,902 B2 | 2/2010 | Graham et al. | |
| 7,681,206 B2 | 3/2010 | Oh et al. | |
| 7,698,398 B1 | 4/2010 | Lai | |
| 7,712,085 B2 | 5/2010 | McCollum et al. | |
| 7,747,569 B2 | 6/2010 | Comi et al. | |
| 7,826,829 B2 | 11/2010 | Pousti | |
| 7,849,010 B2 | 12/2010 | Deyoe et al. | |
| 7,860,484 B2 | 12/2010 | Pousti | |
| 7,991,999 B2 * | 8/2011 | Princen et al. | 713/170 |
| 8,001,555 B2 | 8/2011 | Hellenthal et al. | |
| 8,171,074 B2 | 5/2012 | Nakazawa | |
| 8,438,535 B2 | 5/2013 | Sun | |
| 8,458,808 B2 | 6/2013 | Hill et al. | |
| 8,464,219 B1 | 6/2013 | Wilkerson | |
| 8,484,460 B1 | 7/2013 | Vaughn | |
| 8,490,080 B2 | 7/2013 | Janzen | |
| 2002/0004773 A1 | 1/2002 | Xu et al. | |
| 2002/0032665 A1 | 3/2002 | Creighton et al. | |
| 2002/0095656 A1 | 7/2002 | Clark et al. | |
| 2002/0120546 A1 | 8/2002 | Zajac | |
| 2003/0063750 A1 | 4/2003 | Medvinsky et al. | |
| 2003/0084350 A1 * | 5/2003 | Eibach et al. | 713/201 |
| 2003/0135639 A1 | 7/2003 | Marejka et al. | |
| 2003/0237073 A1 | 12/2003 | Gardas et al. | |
| 2004/0111379 A1 | 6/2004 | Hicks et al. | |
| 2004/0139021 A1 | 7/2004 | Reed et al. | |
| 2004/0162980 A1 * | 8/2004 | Lesenne et al. | 713/153 |
| 2004/0268142 A1 | 12/2004 | Karjala et al. | |
| 2005/0069136 A1 | 3/2005 | Thornton et al. | |
| 2005/0114367 A1 | 5/2005 | Serebrennikov | |
| 2005/0157646 A1 | 7/2005 | Addagatla et al. | |
| 2005/0166262 A1 | 7/2005 | Beattie et al. | |
| 2006/0015463 A1 | 1/2006 | Gupta et al. | |
| 2006/0026552 A1 | 2/2006 | Mazzitelli et al. | |
| 2006/0150176 A1 | 7/2006 | Dorricott et al. | |
| 2006/0153368 A1 | 7/2006 | Beeson | |
| 2006/0161878 A1 | 7/2006 | Koh et al. | |
| 2006/0184452 A1 | 8/2006 | Barnes et al. | |
| 2006/0195401 A1 | 8/2006 | Davis et al. | |
| 2006/0242151 A1 | 10/2006 | Jogand-Coulomb et al. | |
| 2006/0248205 A1 | 11/2006 | Randle et al. | |
| 2007/0074034 A1 | 3/2007 | Adams et al. | |
| 2007/0162898 A1 | 7/2007 | Ramani et al. | |
| 2008/0046279 A1 | 2/2008 | Leahy et al. | |
| 2008/0052373 A1 | 2/2008 | Pousti | |
| 2008/0077560 A1 | 3/2008 | Comi et al. | |
| 2008/0177889 A1 | 7/2008 | Beyer et al. | |
| 2008/0184029 A1 | 7/2008 | Sims et al. | |
| 2008/0194228 A1 | 8/2008 | Pousti et al. | |
| 2008/0209094 A1 | 8/2008 | Travis | |
| 2008/0209451 A1 | 8/2008 | Michels et al. | |
| 2008/0288624 A1 | 11/2008 | Armangil | |
| 2009/0094584 A1 | 4/2009 | Dheap et al. | |
| 2009/0132536 A1 | 5/2009 | Brown et al. | |
| 2009/0219940 A1 | 9/2009 | Jansson | |
| 2009/0249071 A1 | 10/2009 | De Atley et al. | |
| 2009/0254482 A1 | 10/2009 | Vadlamani et al. | |
| 2009/0310789 A1 | 12/2009 | Sie et al. | |
| 2009/0313069 A1 | 12/2009 | Love et al. | |
| 2009/0320050 A1 | 12/2009 | Pousti et al. | |
| 2009/0327139 A1 | 12/2009 | Shah et al. | |
| 2009/0328174 A1 | 12/2009 | Cen et al. | |
| 2010/0057774 A1 | 3/2010 | Pizano et al. | |
| 2010/0100398 A1 | 4/2010 | Auker et al. | |
| 2010/0115585 A1 | 5/2010 | Cohen | |
| 2010/0138316 A1 | 6/2010 | Connors et al. | |
| 2010/0146487 A1 | 6/2010 | Chun et al. | |
| 2010/0169963 A1 | 7/2010 | Kleinpeter et al. | |
| 2010/0188992 A1 | 7/2010 | Raleigh | |
| 2010/0192120 A1 | 7/2010 | Raleigh | |
| 2010/0223471 A1 * | 9/2010 | Fresko et al. | 713/176 |
| 2010/0232594 A1 | 9/2010 | Lawson et al. | |
| 2010/0250748 A1 | 9/2010 | Sivasubramanian et al. | |
| 2010/0251242 A1 | 9/2010 | Sivasubramanian et al. | |
| 2010/0262956 A1 | 10/2010 | Okada | |
| 2010/0275012 A1 | 10/2010 | Kido et al. | |
| 2010/0306072 A1 | 12/2010 | Ford, Jr. et al. | |
| 2010/0325155 A1 | 12/2010 | Skinner et al. | |
| 2011/0113405 A1 | 5/2011 | Guerrera et al. | |
| 2011/0153590 A1 | 6/2011 | Chang et al. | |
| 2011/0154027 A1 | 6/2011 | Liu et al. | |
| 2011/0154130 A1 | 6/2011 | Helander et al. | |
| 2011/0154302 A1 | 6/2011 | Balko et al. | |
| 2011/0184866 A1 | 7/2011 | Shakkarwar | |
| 2011/0196914 A1 | 8/2011 | Tribbett | |
| 2011/0296440 A1 | 12/2011 | Laurich et al. | |
| 2012/0017222 A1 | 1/2012 | May | |
| 2012/0102179 A1 | 4/2012 | Qiu et al. | |
| 2012/0179587 A1 | 7/2012 | Hill et al. | |
| 2012/0180021 A1 | 7/2012 | Byrd et al. | |
| 2012/0180022 A1 | 7/2012 | Hopkins | |

OTHER PUBLICATIONS

International Search Report and Written Opinion for International Application No. PCT/US11/67189 mailed Feb. 21, 2012 (11 pgs).

International Search Report for International Application No. PCT/US11/67181 mailed Apr. 18, 2012 (11 pgs).

International Search Report for International Application No. PCT/US11/67208 mailed Jun. 15, 2012.

International Search Report for International Application No. PCT/US11/67522 mailed Apr. 15, 2013.

International Search Report and Written Opinion for International Application No. PCT/US11/67201 mailed Apr. 18, 2012 (10 pgs).

International Search Report and Opinion for co-pending PCT patent application No. PCT/US2011/067517.

B.J. Overeinder et al., "Web Service Access Management for Integration with Agent Systems", [Online], ACM 2008, pp. 1-7, [Retrieved from Internet on Nov. 2, 2013], <http://sysnet.ucsd.edu/~pverkaik/pubs/agentsoap-mas2008.pdf>.

David L. Martin et al., "The Open Agent Architecture: A Framework for Building Distributed Software System", [Online], 1999, pp. 1-38, [Retrieved from Internet on Nov. 2, 2013], <http://www.math.pku.edu.cn/teachers/linzq/teaching/stm/references/The%20open%20agent%20architecture.pdf>.

Herbert H. Thompson, "The Subtle Security Risks of Web Services", [Online], 2006, pp. 604-606, [Retrieved from Internet on Nov. 2, 2013], <http://download.springer.com/static/pdf/223/art%253A10.1007%252Fs11623-006-0157-7.pdf>.

Dipanjan Chakraborty et al., "Service Composition for Mobile Environments", [Online], 2005, pp. 1-34, [Retrieved from Internet on Nov. 2, 2013], <http://aisl.umbc.edu/resources/96.pdf>.

Xiulan Yu et al., "WSCE: A Flexible Web Service Composition Environment", [Online], IEEE 2004, pp. 1-8, [Retrieved from Internet on Nov. 9, 2013], <http://ieeexplore.ieee.org/stamp/stamp.jsp?tp=&arnumber=1314767>.

Sebastian Kabisch et al., "Optimized XML-based Web Service Generation for Service Communication in Restricted Embedded Environments", [Online], IEEE, 2011, pp. 1-8, [Retrieved from Internet on Nov. 9, 2013], <http://ieeexplore.ieee.org/stamp/stamp.jsp?tp=&arnumber=6059002>.

Ravishankar Shiroor et al., "Process Centric Guidance and Tools for Next Generation Network Service API Design", [Online], 2010 IEEE, pp. 1-6, [Retrivedfrom Internet on Nov. 9, 2013], <http://ieeexplore.ieee.org/stamp/stamp.jsp?tp=&arnumber=5729408>.

(56) References Cited

OTHER PUBLICATIONS

Soonchul Jung et al., "Call/Messaging Open API for Telecommunication Services", [Online], IEEE 2008, pp. 1139-1143, [Retrieved from Internet on Nov. 9, 2013], <http://ieeexplore.ieee.org/stamp/stamp.jsp?tp=&arnumber=4493967>.

Saul Greenberg et al., "Phidgets: Easy Development of Physical Interfaces through Physical Widgets", [Online], ACM 2001, pp. 209-218, [Retrieved from Internet on Dec. 3, 2013], <http://citeseerx.ist.psu.edu/viewdoc/download?doi=10.1.1.186.9414&rep=rep1&type=pdf>.

Jit Biswas et al., "The IEEE P1520 Standards Initiative for Programmable Network Interface", [Online], IEEE1998, pp. 64-70, [Retrieved from Internet on Dec. 3, 2013], <http://ieeexplore.ieee.org/stamp/stamp.jsp?tp=&arnumber=722138>.

Zhengyu Liang et al., "ClusterProbe: An Open, Flexible and Scalable Cluster Monitoring Tool", [Online], IEEE 1999, pp. 1-10, [Retrieved from Internet on Dec. 3, 2013],<http://citeseerx.ist.psu.edu/viewdoc/download?doi=10.1.1.37.4540&rep=rep1&type=pdf>.

Gabrielle Allen et al., "The Grid Application Toolkit: Toward Generic and Easy Application Programming Interfaces for the Grid", [Online], IEEE 2005, pp. 534-550, [Retrieved from Internet on Dec. 3, 2013], <http://tangviz.cct.lsu.edu/papers/allen-ieee04-gat.pdf>.

\* cited by examiner

METHOD AND SYSTEM FOR PROPAGATING A CLIENT IDENTITY

CROSS REFERENCE TO RELATED APPLICATIONS

This patent application claims priority to U.S. Provisional Patent Application Ser. No. 61/430,850, filed on Jan. 7, 2011, which is hereby incorporated by reference in its entirety.

BACKGROUND OF THE INVENTION

This invention relates generally to providing access to a computer system through an open application programming interface (API) and, more particularly, to network-based methods and systems for propagating a client identity in a service call from a gateway system to a target service system.

There are service provider companies that provide a variety of services to numerous consumers. These service provider companies utilize computer systems to provide these services. For example, in the financial industry, companies such as large banks, interchange networks and payment networks provide certain financial services to consumers, companies and other banks. Oftentimes, these service provider companies provide services that include receiving, processing and storing financial data in computer systems managed by the service provider companies. In many cases, access to this financial data is restricted to certain approved users. Restricting access to such financial data provides at least some protection for the data. However, it also limits the potential uses of the data.

Software developers around the world are able to develop computer programs, sometimes called applications, which are configured to utilize data such as the data stored within computer systems used by certain service provider companies. Of course, in order for these computer programs to use such data, the developer programs must be able to access the data and be able to request the data in a proper format. One way to access the data stored by these service provider companies is through an open application programming interface (API).

By allowing software developers to access data stored within computer system used by these service provider companies, the service provider companies are able to leverage these developer applications as well as increase their transaction volume. Thus, by providing this data access to developers, these service provider companies are able to provide additional services to both existing and new customers, which in turn improves the profitability of these companies. However, the providing of such data access also creates certain risks and challenges for the service provider companies.

Accordingly, it would be desirable to provide a computer system having an open API that could be used by certain service provider companies, such as financial transaction companies, that is configured to: (i) propagate a client identity in a service call from a gateway system to a target service system in a service provider (SP) computer system; (ii) provide to a service system security authorization for the identity for each request message requesting services; and (iii), and provide client profile information to the service system to permit additional features to be incorporated into the response.

BRIEF DESCRIPTION OF THE INVENTION

In one embodiment, a computer system for propagating a client identity in a service call from a first system to a target service system in a service provider (SP) computer system for an API service application stored within a service owner (SO) computer device includes a memory device for storing data and a service provider (SP) computer system including a processor and an open application programming interface (API) platform, the SP computer system in communication with the memory device and the SO computer device. The SP computer system is programmed to receive a message defining an API service request including at least a header portion and a payload portion, determine at the first system an identity of an application transmitting the received message using identity information contained in the header portion that has already been established within the first system, digitally sign the identity information wherein information used in the digital signature is pre-established with the service system, pair the identity information and the corresponding digital signature in a header of a request message to be transmitted from the first system to the service system, receive by the service system the request message and extracting the identity information and corresponding digital signature from the header, validate by the service system the corresponding digital signature, and for signatures that are successfully validated, construct using the corresponding identity information a data structure that represents the original identity established in the first system.

In another embodiment, a computer-implemented method of propagating a client identity in a service call from a gateway system to a target service system in a service provider (SP) computer system includes receiving a message defining an API service request including at least a header portion and a payload portion, determining at the gateway system an identity of an application transmitting the received message using identity information contained in the header portion that has already been established within the gateway system, digitally signing the identity information wherein information used in the digital signature is pre-established with the service system, pairing the identity information and the corresponding digital signature in a header of a request message to be transmitted from the gateway system to the service system, receiving by the service system the request message and extract the identity information and corresponding digital signature from the header, validating by the service system the corresponding digital signature, and for signatures that are successfully validated, constructing using the corresponding identity information a data structure that represents the original identity established in the gateway system.

In yet another embodiment, one or more computer-readable non-transitory media includes a computer-executable program that instructs at least one processor to propagate a client identity in a service call from a first system to a target service system for an API service application stored within a service provider (SP) computer system through an open application programming interface (API) platform. The computer-executable program includes at least one code segment that instructs the at least one processor to receive a message defining an API service request including at least a header portion and a payload portion, determine at the first system an identity of an application transmitting the received message using identity information contained in the header portion that has already been established within the first system, digitally sign the identity information wherein information used in the digital signature is pre-established with the service system, pair the identity information and the corresponding digital signature in a header of a request message to be transmitted from the first system to the service system, receive by the service system the request message and extract the identity information and corresponding digital signature from the header, validate by the service system the corresponding digital signature, and for signatures that are successfully validated, construct using the corresponding identity information a data structure that represents the original identity established in the first system.

BRIEF DESCRIPTION OF THE DRAWINGS

FIGS. 1-6 show exemplary embodiments of the method and system described herein.

DETAILED DESCRIPTION OF THE INVENTION

The following detailed description illustrates embodiments of the invention by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an exemplary embodiment, namely, systems and methods of generating properly formatted API service request messages. However, it is contemplated that this disclosure has general application to computing systems in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Embodiments of the present invention described herein relate to propagation of one or more identities (system, user, etc.), authorization information related to each identity, and miscellaneous data associated with each identity between two applications using, for example, but not limited to the HTTP protocol in a manner that is independent of the HTTP request payload. This process is used to propagate the desired identity information to an unlimited number of downstream applications.

Figure 1:
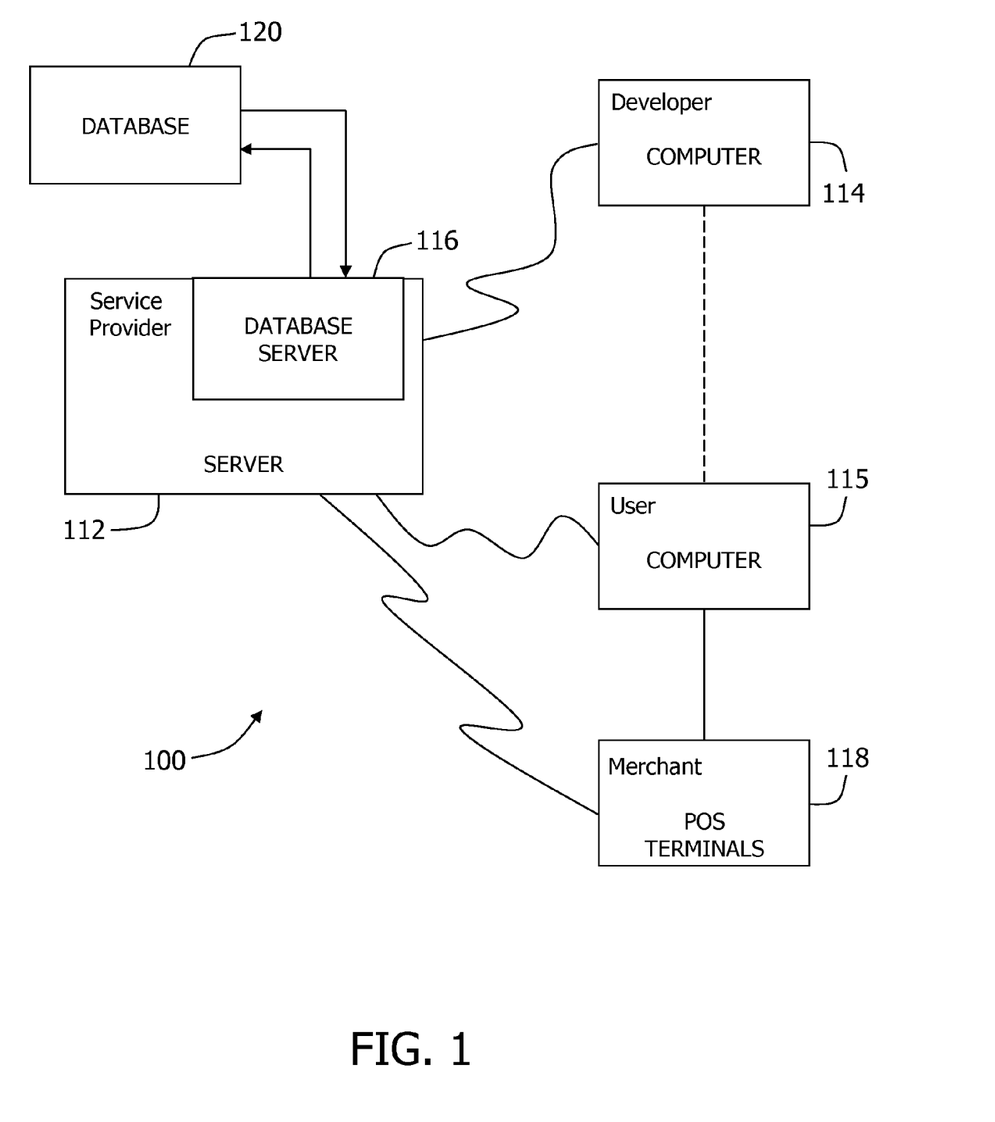
FIG. 1 is a simplified block diagram of an exemplary service system including a plurality of computer devices in accordance with one embodiment of the present invention.

FIG. 1 is a simplified block diagram of an exemplary service system 100 including a plurality of computer devices in accordance with one embodiment of the present invention. System 100 includes a service provider system (e.g., financial services provider) that allows developers of computer applications to access a variety of service applications hosted by the service provider (SP) computer system such that the developer applications can utilize data stored within the SP computer system. The developer applications can be utilized by the developer via a developer computer system or can be offered to a consumer, a merchant, an acquirer or an issuer (collectively a "user") for use by the users via user computer systems.

More specifically, in the example embodiment, system 100 includes a server system 112, which is a type of computer system, and a plurality of client sub-systems (also referred to as client systems 114 and 115) connected to server system 112. In one embodiment, client systems 114, 115 are computers including a web browser, such that server system 112 is accessible to client systems 114, 115 using the Internet. Client systems 114, 115 are interconnected to the Internet through many interfaces including a network, such as a local area network (LAN) or a wide area network (WAN), dial-in-connections, cable modems, and special high-speed ISDN lines. Client systems 114, 115 could be any device capable of interconnecting to the Internet including a web-based phone, personal digital assistant (PDA), or other web-based connectable equipment.

System 100 also includes point-of-sale (POS) terminals 118, which may be connected to client systems 114, 115 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114, 115 by logging onto server system 112 through one of client systems 114, 115. In an alternative embodiment, database 120 is stored remotely from server system 112 and may be non-centralized.

Database 120 may store transaction data generated as part of sales activities conducted over the services network including data relating to merchants, account holders or customers, developers, issuers, acquirers, purchases made, and services provided by system 100. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, client system 114 may be associated with a developer of computer applications and may be referred to as a developer computer device, and client system 115 may be associated with a consumer, an acquirer or an issuer and may be referred to as a user computer device. Developer computer device 114 stores developer applications that a user may access and utilize via user computer device 115. Server system 112 may be associated with a service provider (SP) and maybe referred to as a SP computer device. In the example embodiment, an SP may include a payment network provider, an interchange network provider, or any other provider of financial services.

In the embodiment where the SP is an interchange network provider, system 100 includes POS terminals 118, which may be associated with a merchant. In this embodiment, system 100 may be part of a multi-party payment card industry system for enabling ordinary payment-by-card transactions such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

For example, in a typical payment card system, a financial institution called the "issuer" issues a payment card, such as a credit card, to a consumer, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank." When a consumer tenders payment for a purchase with a payment card (also known as a financial transaction card), the merchant requests authorization from the merchant bank for the amount of the purchase. The request may be performed over the telephone, but is usually performed through the use of a point-of-sale terminal, which reads the consumer's account information from the magnetic stripe on the payment card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange network, the computers of the merchant bank or the merchant processor will communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Although the SP has been described herein as an interchange network provider, it does not have to be so limited. As indicated above, the SP may also be a payment network provider or any other provider of financial services. In these embodiments, a transaction card, a payment or even a purchase are not necessarily needed to utilize the services provided by the SP.

Figure 2:
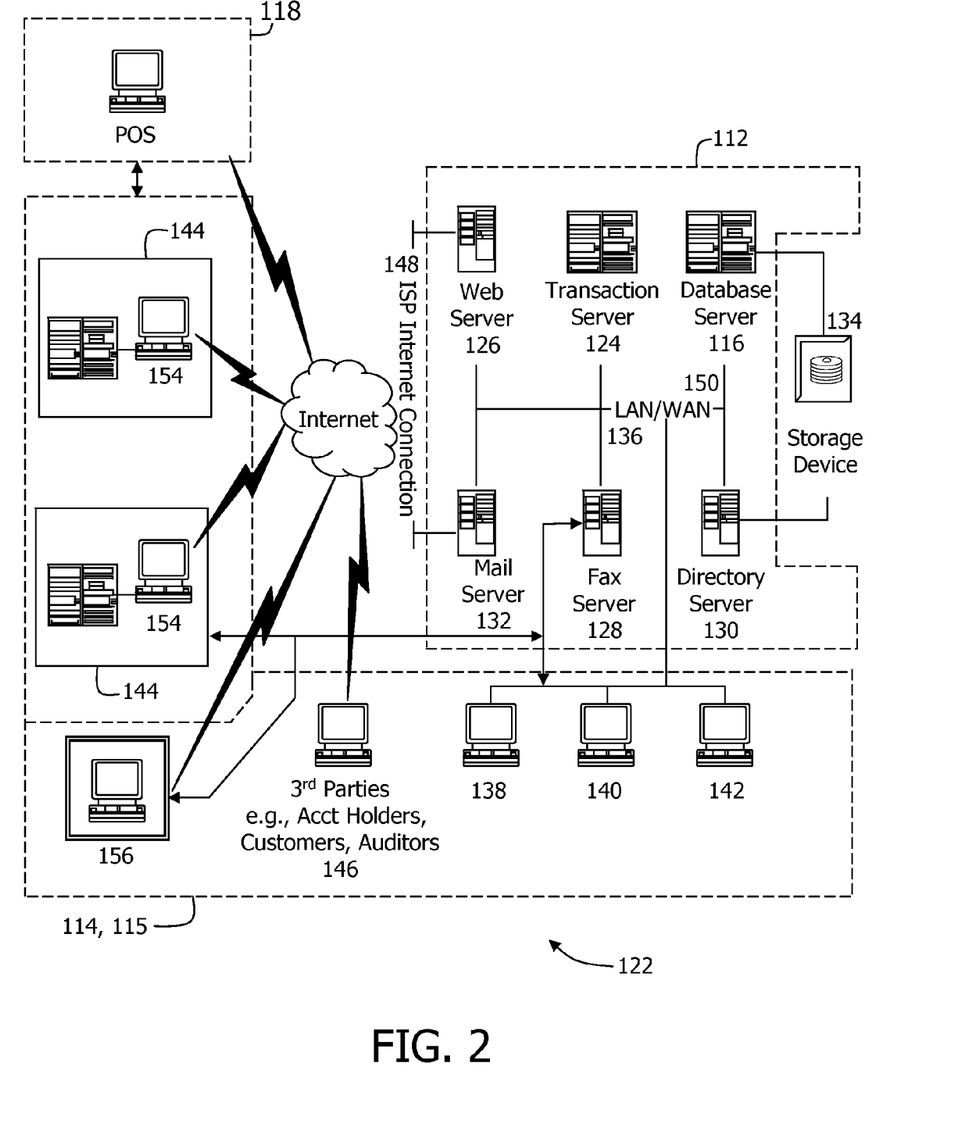
FIG. 2 is an expanded block diagram of an exemplary embodiment of a server architecture of the service system including the plurality of computer devices in accordance with one embodiment of the present invention.

FIG. 2 is an expanded block diagram of an exemplary embodiment of a server architecture of a service system 122 including other computer devices in accordance with one embodiment of the present invention. Components in system 122, identical to components of system 100 (shown in FIG. 1), are identified in FIG. 2 using the same reference numerals as used in FIG. 1. System 122 includes server system 112, client systems 114 and 115, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 3:
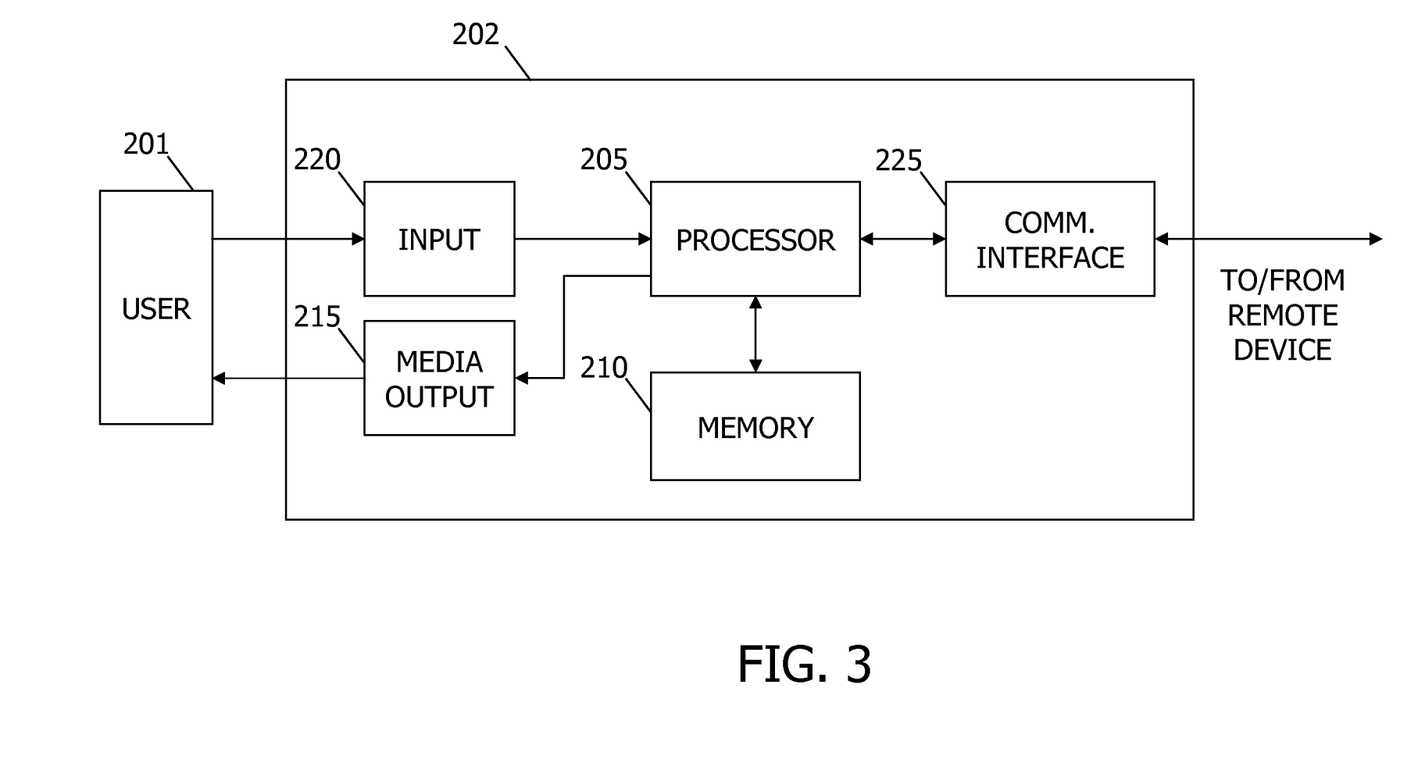
FIG. 3 is a block diagram of an exemplary embodiment of a user computer device as shown in FIGS. 1 and 2.

FIG. 3 illustrates an exemplary configuration of a user computer device 202 operated by a user 201. User computer device 202 may include, but is not limited to, client systems 114, 115, 138, 140, and 142, 146, POS terminal 118, workstation 154, and manager workstation 156 (shown in FIG. 2).

User computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media.

User computer device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, user computer device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

User computer device 202 may also include a communication interface 225, which is communicatively couplable to a remote device such as server system 112. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 4:
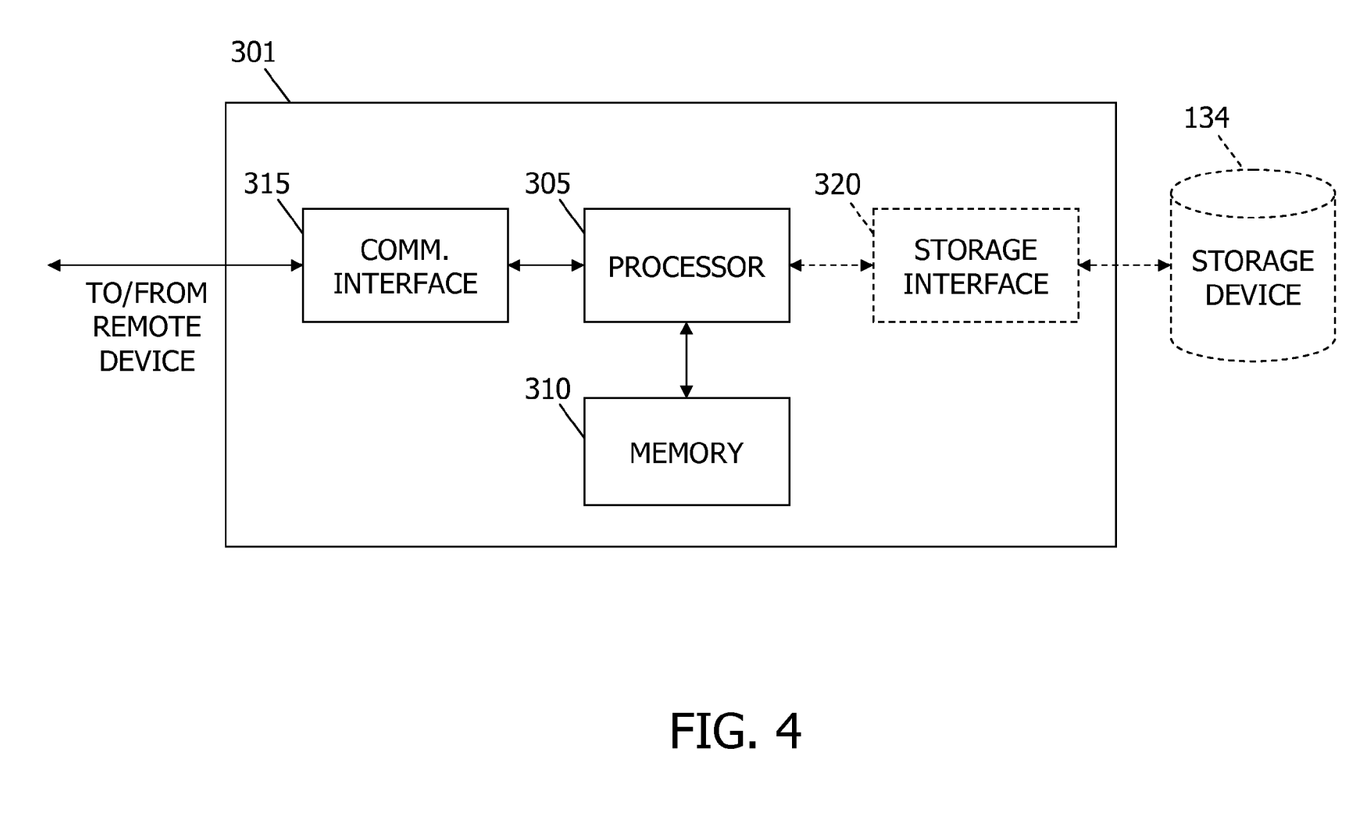
FIG. 4 is a block diagram of an exemplary embodiment of a server computer device as shown in FIGS. 1 and 2.

FIG. 4 illustrates an exemplary configuration of a server computer device 301 such as server system 112 (shown in FIGS. 1 and 2). Server computer device 301 may include, but is not limited to, database server 116, transaction server 124, web server 126, fax server 128, directory server 130, and mail server 132.

Server computer device 301 includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computer device 301 is capable of communicating with a remote device such as user computer device 202 or another server computer device 301. For example, communication interface 315 may receive requests from user computer device 114, 115 via the Internet, as illustrated in FIGS. 1 and 2.

Processor 305 may also be operatively coupled to a storage device 134. Storage device 134 is any computer-operated hardware suitable for storing and/or retrieving data. In some embodiments, storage device 134 is integrated in server computer device 301. For example, server computer device 301 may include one or more hard disk drives as storage device 134. In other embodiments, storage device 134 is external to server computer device 301 and may be accessed by a plurality of server computer devices 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory areas 210 and 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
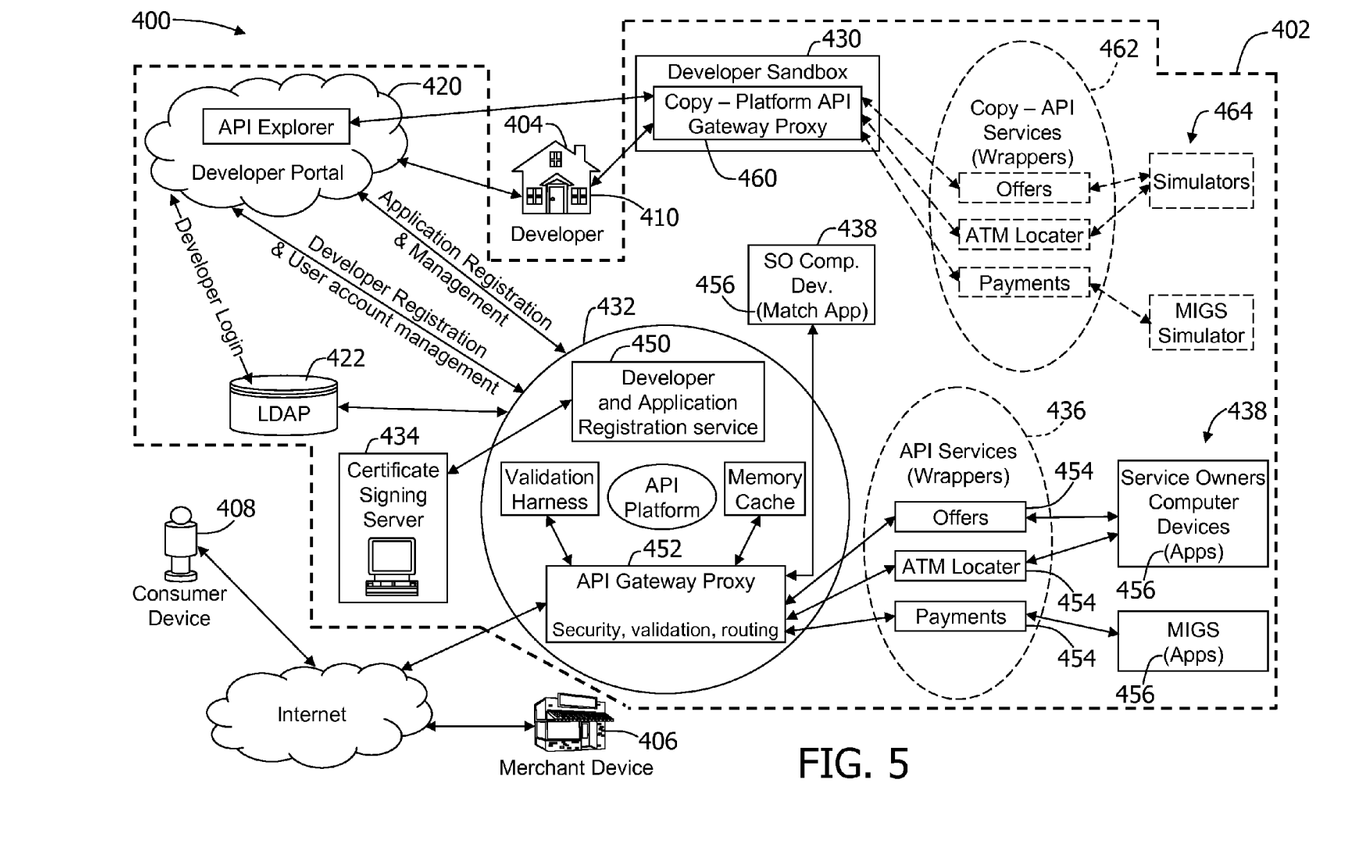
FIG. 5 is a more detailed block diagram of an exemplary configuration of the service provider computer system in communication with other computer devices as shown in FIGS. 1 and 2.

FIG. 5 illustrates an exemplary configuration of a service system 400 in accordance with the present invention. System 400 is similar to systems 100 and 122 (shown in FIGS. 1 and 2). In the example embodiment, system 400 includes a service provider computer system 402 such as SP server system 112 (shown in FIGS. 1 and 2), a developer computer device 404 such as developer computer device 114 (shown in FIGS. 1 and 2), a merchant computer device 406 such as user computer device 115 (shown in FIGS. 1 and 2), and a consumer computer device 408 such as user computer device 115 (shown in FIGS. 1 and 2).

Developer computer device 404 includes a processor for executing instructions. Instructions may be stored in a memory area. The memory area may also include one or more developer applications 410. Applications 410 include computer-implemented instructions that cause a computer device to interact with another computer device. For example, a developer may create an application 410 for locating ATMs included within a network of ATMs serviced by the SP (referred to as the "ATM Locator App"). The ATM Locator App can be stored within the memory area for use by computer device 404. Developer computer device 404 is in communication with SP computer system 402 through a developer portal 420, and through a developer sandbox platform 430. As explained below in greater detail, sandbox platform 430 is a test platform provided by SP computer system 402 that enables a developer to test its applications with test data before such applications are rolled out for processing live production data.

SP computer system 402 includes API portal 420, memory device 422, sandbox platform 430, API platform 432, certificate signing server 434, API services wrapper 436, and SO computer systems 438.

API portal 420 is configured to communicate with developer computer device 404, and facilitates managing developer registration and login with system 402. API portal 420 also enables developer computer device 404 to communicate with API platform 432. API portal 420 communicates with memory device 422 to facilitate a login by a developer.

API platform 432 includes a registration service 450 that is used to register developers and developer applications 410 with SP computer system 402. Registration service 450 is in communication with certificate signing server 434. API platform 432 also includes an API gateway proxy 452.

API platform 432 is in communication with API services wrapper 436. API services wrapper 436 includes wrappers 454 for each service application 456 provided by an SO within SP computer system 402. Service applications 456 are stored at SO computer systems 438. SO computer systems 438 are in communication with API platform 432 through API services wrapper 436 or may be connected directly with API platform 432 without a wrapper.

Continuing with the ATM Locator App example from above, SO computer devices 438 may include a service application 456 that includes data showing a location of each of the ATM machines included within the network serviced by the SP (referred to as the "ATM Locator Service"). In this example, the ATM Locator App, which is stored on developer computer device 404, is able to communicate with SO computer device 438 through API platform 432 and API services wrapper 436 by developer computer device 404 sending a data request to SO computer device 438, and by receiving a data response back from SO computer device 438. Developer computer device 404 is then able to display the location of all the ATMs within the SP network or at least some of the ATMs within the network.

Merchant computer device 406 and consumer computer device 408 each include a processor for executing instructions. Instructions may be stored in a memory area. The memory area may also include one or more developer applications 410 downloaded from developer computer device 404 for use by the merchant, consumer, acquirer, and/or issuer (collectively a "user"). In other words, a developer may develop an application that can be used by a user on their computer devices (e.g., a POS device, a personal computer, smart phone or PDA). The user downloads the application from the developer to their computer device for use by the user. When the user uses developer application 410, merchant and/or consumer computer devices 406, 408 communicate with SP computer system 402 through API platform 432. Continuing with the ATM Locator App example from above, the user can download the ATM Locator App from developer computer device 404. Consumer computer device 408 is then able to communicate with SO computer devices 438 through API platform 432 and API services wrapper 436 by sending a data request to SO computer devices 438, and by receiving a data response back from SO computer devices 438. Consumer computer device 408 is then able to display the location of all the ATMs within the SP network or at least some of the ATMs with the network.

As discussed above, SP computer system 402 includes a developer sandbox platform 430, which enables a developer to test its applications with test data before such applications are rolled out for processing live production data. Sandbox platform 430 includes a copy 460 of API gateway proxy 452, a copy 462 of API services wrapper 436, and simulator computer devices 464 which are configured to simulate SO computer devices 438. Sandbox platform 430 includes test data that allows a developer to test its applications 410 prior to rolling out applications 410 for production use.

In the example embodiment, a developer visits a web portal, referred to as API portal 420, designed specifically for SP computer system 402. At the home page, developers will be prompted to register with API platform 432. The registration process will collect, and authenticate as required, the following data elements from the developer: first name, last name, username, password, email address, country, street address, city, state/province, postal code, phone number, and company/university affiliation. Additionally, as a condition of registration, developers must opt-in to the program by affirmatively consenting to the terms and conditions and privacy notice. API portal 420 also includes a mechanism for the developers to request access to their information in the event that they desire to change, modify or delete such information.

Once registered and authenticated, developers can log into API portal 420 and access a variety of information regarding the various service applications 456 (e.g., service offerings such as payments, locators, offers, MATCH, etc.). Each service application 456 will have its own page(s) dedicated to describing the business requirements and specifications for that service in a format easily understood by non-industry developers.

Additionally, the developers will be able to log into API portal 420, register a key alias and request a sandbox key. The sandbox key allows developer's applications to access sandbox platform 430, which is an environment where developers can test and validate messages using service simulators 464.

Once a developer has been given a sandbox key, the developer can return to API portal 420 at any time and request a production key. A production key and client ID will be issued for the key alias used by the developer in the developer application. The client ID will identify which key alias is using API platform 432 to process messages and the developer that owns the production key. In the example embodiment, sandbox and production keys are not intended to be transferable or shared.

For every message that API platform 432 processes, the following will be logged: message request type; date and time received; path (message URL); IP address of sender; user agent of sender (name of sending application like IE, Firefox, or a different name); process time; and success or fail. If fail then, error information; client ID; key alias; user ID (system generated ID for developer account that owns the client ID); and unique message ID. There may be additional data elements collected based on the differing requirements of the various API service offerings. For example: for payments that have a merchant, a merchant ID will be logged in addition to the elements listed above.

In the example embodiment, a developer is required to register with SP computer system 402 to access certain information. However, an unregistered developer is able to access some information within SP computer system 402. For example, an unregistered developer can: review available API information, documentation and sample code; access certain functions; and access community pages and read forums. However, an unregistered developer cannot: post forum comments or blogs; create a key alias; or request a sandbox or production key.

API portal 420 provides a mechanism for developers to learn about the services that are available. They have the ability to: register; communicate with other developers via the forums; request keys for sandbox (testing) and production environments; view their personal dashboard; and view metrics on transactions for each key alias they have created. The keys provide message security between the developers and SP computer system 402.

SP computer system 402 allows a developer to interact with API sandbox platform 430. The developer uses sandbox platform 430 for testing and validating applications 410 by using simulators 464. The messages sent by developer applications 410 to API gateway proxy copy 460 are verified with a key. The key verifies that the message was not tampered with between the sender and SP computer system 402. The transaction in the message is authenticated by the backend simulator computer devices 464. The following data elements are collected from the developer during the sandbox key request process: (1) Key Alias: This is the alias the developer assigns to the key. It is used to present a user friendly identifier of the key on the dashboard. The dashboard is a web page on the portal website with the purpose of automatically displaying important information, objects, etc. (2) Description: The description of the key. It is assigned by the developer. Used on the dashboard to present the developer with a description of the key. (3) Use: This identifies if the key is for personal or commercial use. Personal use is an individual that intents to personally use or give to others for their personal use without charge. Commercial use is an individual that is developing for use by their employer or an individual that intends to sell their application to others. (4) Notes: This is free form notes that the developer can associate with the key. (5) Calls: This is the expected number of calls using the production key. It is assigned by the developer. Used by the SP for capacity planning (6) Profitable: This identifies if the developer intends the key to be used to generate a profit. It is assigned by the developer. (7) Certificate: The SP signs the certificate and makes it available to the developer on the dashboard to download. The developer sandbox key is valid for testing all available API service applications with general access and any premium services that the developer, key alias and client ID have an approved production key.

SP computer system 402 assigns a production key to a developer. During this phase, the developer will be assigned a production key number and that key number will be provided to SP computer system 402 during each call. SP computer system 402 will use the production key number to control access and track developer activity throughout the process. In the example embodiment, an existing key alias and sandbox key are required prior to requesting a production key. The following data elements are collected from the developer during the production key request process: (1) Certificate: SP computer system 402 signs the certificate and makes it available to the developer on the dashboard to download. (2) Production Services Requested This is a request for which services the production key will be valid.

A developer is able to engage a customer of the SP. The developer can build applications 410 for any of SP's business partners, including merchants, issuers, acquirers, or any other party in the SP network. The following examples describe a developer building a developer application 410 for a merchant user (the user could also be an individual, an acquirer, a processor or an issuer). The developer may be working directly for a merchant or for themselves to sell their application 410 to a merchant. The roles of the developer and merchant are separate. The SP does not have to be part of the relationship between the developer and the merchant. In some embodiments, the merchant may be required to have a relationship with the service application 456 being used, e.g. MiGS (MasterCard Internet Gateway System). The merchant and merchant acquirer would need to be registered with MiGS and have the credentials to prove that relationship is valid prior to using API platform 432.

In the example embodiment, the SP has a trust relationship with an existing merchant. The messages sent by merchant computer device 406 using developer application 410 to API gateway proxy 452 are verified with a key (public and private key). The key verifies that the message was not tampered with between the sender and API platform 432. The transaction in the message is authenticated by the backend service application 456. During this phase, customer authentication is managed by the SO of service application 456 being called.

In the example embodiment, SP computer system 402 includes a certificate signing request (CSR) and a key generation process. This process is started by the developer after registration on API portal 420. The keys/certificates are generated by the developer outside of SP computer system 402 with open source tools (like Open SSL). The SP does not own the developer's private or public key. A developer could theoretically use the same key with multiple open API's or programs not just the open API of the SP. The developer owns their private key, public key and CSR (Certificate Signature Request). The basic steps in the process are as follows: (1) the developer uses an open source tool and requests a CSR; (2) the tool provides a private and public key pair, and the public key is included in the CSR; (3) the developer uploads the CSR which contains the public key to API platform 432; (4) API platform 432 assigns a client ID and signs the developer's public key, wherein the combination of the client ID and the signed developer's public key comprises the production key; (5) the developer then uses the client ID (which is included in the production key) in each message sent to API platform 432 that is digitally signed with the private key on developer's computer device 404; (6) API platform 432 uses the client ID to identify which public key to use to verify the private key used to sign the message. Tools used to create keys and a CSR typically ask the developer to enter the following information when creating a CSR and key pair: name, organization, organizational unit, city, state or province, and country.

Figure 6:
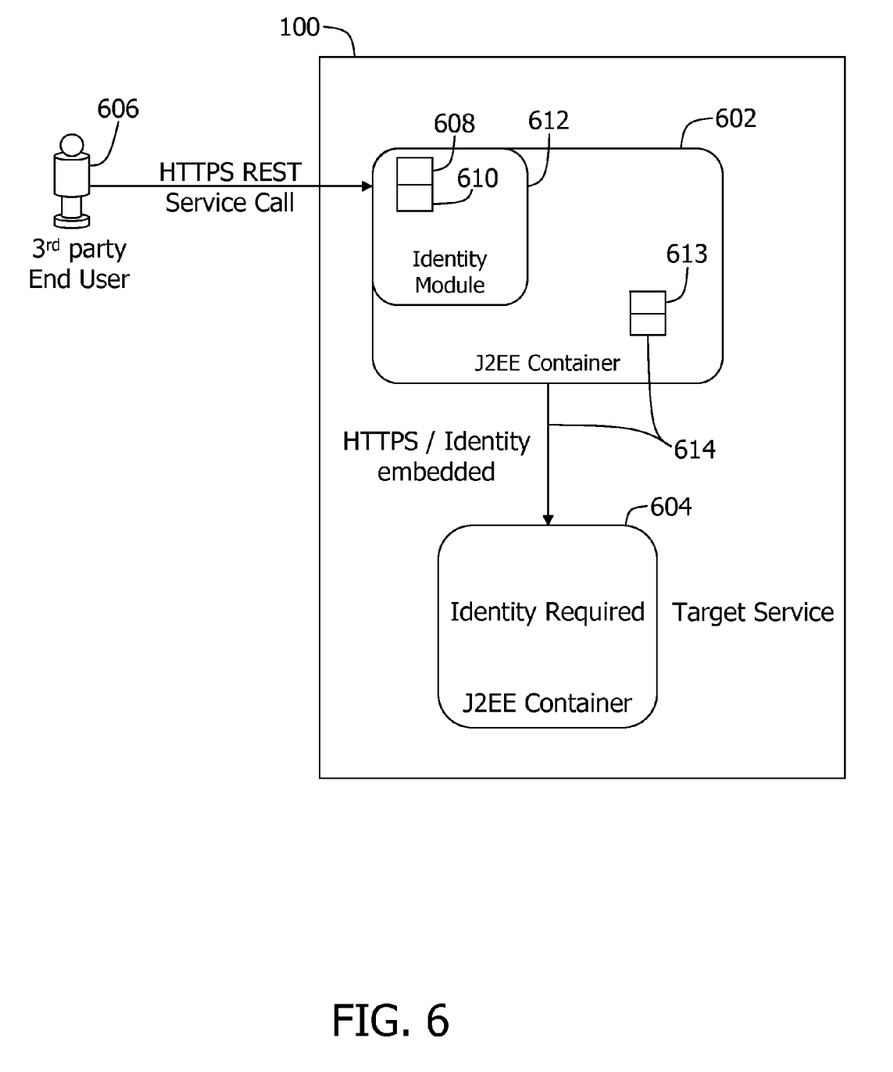
FIG. 6 is a schematic block data flow diagram illustrating a Hypertext Transfer Protocol Secure (HTTPS) Representational State Transfer (REST) service call in accordance with an exemplary embodiment of the present invention.

FIG. 6 is a schematic block data flow diagram illustrating a Hypertext Transfer Protocol Secure (HTTPS) Representational State Transfer (REST) service call in accordance with an exemplary embodiment of the present invention. In the exemplary embodiment, the HTTPS REST service call is made in an open API system from a client such as, but not limited to, a user of a programmed application making the call, a merchant, and a developer. In the exemplary embodiment, a computer system such as, but not limited to, service system 100 is configured to propagate a client identity in a service call from a gateway system 602 to a target service system 604 in a service provider (SP) computer system for an API service application stored within a service owner (SO) computer device. Gateway system 602 is configured to limit access to service system 100 to only authorized or identifiable users using for example, a username and password and to determine that received messages have not been tampered with. Target service system 604 is configured to receive a request for a service, which may require the identity of the requester to fulfill.

Service system 100 receives, from a third party end user 606, a message defining an API service request that includes at least a header portion 608 and a payload portion 610. The message may be in the form of a HTTPS REST service call. Gateway system 602 may be configured to determine an identity of an application transmitting the received message using identity information contained in header portion 608. The identity information identity represents at least one of an entity responsible to the SP computer system for the application, a merchant, and an application user and has already been established within gateway system 602 using an identity module 612. Gateway system 602 digitally signs the identity information wherein the security information used in the digital signature is pre-established with target service system 604. The information that is digitally signed may also include security authorization and profile information related to the identified entity. For example, preferences as to how the response is to be transmitted back to the requester, such as by email, may be included in a profile specific to the identified requester. Additional profile information may also be included that relates to preferences of the developer, merchant or other entity.

The identity information and the corresponding digital signature may be paired in a new header 613 of a request message 614 to be transmitted from gateway system 602 to service system 604. A name of the new request message header 613 is pre-established with the service system 604. Target service system 604 receives request message 614 and extracts the identity information and corresponding digital signature from new header 613 and validates the corresponding digital signature. For signatures that are successfully validated, target service system 604 constructs a data structure that represents the original identity established in the gateway system using the corresponding identity information.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is propagating a client identity in a service call from a gateway system to a target service system in a service provider (SP) computer system, providing to a service system a signed certificate and identity for each request message requesting services, and providing client profile information to the service system to permit additional features to be incorporated into the response. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of propagating a client identity in a service call from a gateway system to a target service system in a service provider (SP) computer system provides a cost-effective, secure, and reliable means for providing to a service system a digital signature and identity for each request message requesting services, and providing client profile information to the service system to permit additional features to be incorporated into the response.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer system for securely propagating an identity included in a service call request message for an open Application Programming Interface (API) service application from a first service system to a target service system in a service provider (SP) computer system, the service application stored within a service owner (SO) computer device, the SO computer device associated with a SO, the computer system comprising:
   a memory device for storing data; and
   a service provider (SP) computer system comprising a processor and an open application programming interface (API) platform, the SP computer system in communication with the memory device and the SO computer device, said SP computer system programmed to:
   receive a first request message from an entity outside of the SP computer system, at the first service system, the first request message defining an API service request comprising a header portion and a payload portion;
   determine, by the first service system, identity information to be transmitted to the target service system, the target system within the SP computer system, the identity information identifying a source outside of the SP computer system of the received message;
   construct a data structure that contains the identity information and is able to be digitally signed;
   receive, from the target service system, signature information for creating a digital signature;
   digitally sign the identity information wherein the signature information used in the creation of the digital signature is pre-established with the target service system;
   pair the identity information and the corresponding digital signature in a header of a second request message to be transmitted from the first service system to the target service system;
   receive by the target service system the second request message and extract the identity information and corresponding digital signature from the header;
   validate by the target service system the corresponding digital signature; and
   for signatures that are successfully validated, construct using the corresponding identity information a data structure that represents the original identity established in the first service system.

2. A computer system in accordance with claim 1, wherein the received first request message comprises an HTTP message defining the API service request.

3. A computer system in accordance with claim 1, wherein the identity information represents at least one of a message source computer system, an application, an organization and a user.

4. A computer system in accordance with claim 1, wherein the data structure used to represent the identity information takes the form of a string of text, XML or SAML.

5. A computer system in accordance with claim 1, wherein the first service system is programmed to pair the identity information and the corresponding signature in an HTTP header of the request message to the target service system wherein a name of the HTTP request message header is pre-established with the target service system.

6. A computer system in accordance with claim 1, wherein the service provider computer system is programmed to determine that the received first request message has not been tampered with.

7. A computer system in accordance with claim 1, wherein signature information used in the construction of the digital signature comprises a public/private key certificate pre-established with the target service system.

8. A computer system in accordance with claim 1, wherein the identity information that is digitally signed comprises profile information related to an identified entity.

9. A computer system in accordance with claim 8, wherein the profile information related to the identified entity comprises application user profile information.

10. A computer system in accordance with claim 8, wherein the profile information related to the identified entity comprises application developer profile information.

11. A computer system in accordance with claim 8, wherein the profile information related to the identified entity comprises merchant profile information.

12. A computer system in accordance with claim 8, wherein the profile information related to the identified entity comprises security authorization information, including security roles or groups.

13. A computer system in accordance with claim 1, wherein the target service system provides access to data or logic as a service.

14. A computer system in accordance with claim 1, wherein the identity information and corresponding digital signature are stored in separate HTTP headers within an HTTP request message.

15. A computer system in accordance with claim 14, wherein the first service system is programmed to store the identity information and the corresponding signature in separate HTTP headers of the HTTP request message to the target service system wherein the names of the HTTP request message headers are pre-established with the target service system.

16. A computer system in accordance with claim 1, wherein the first service system communicates more than one identity to the target service system within a single second request message.

17. A computer system in accordance with claim 16, wherein the first service system uses separate HTTP headers for communication of each pair of identity information and corresponding digital signature.

18. A computer system in accordance with claim 17 wherein the first service system uses separate public/private key certificates to digitally sign each set of identity information.

19. A computer-implemented method of propagating a client identity included in a service call from a gateway system to a target service system in a service provider (SP) computer system, said method comprising:

receiving, at the gateway system from an entity outside of the SP computer system, a message defining an Application Programming Interface (API) service request comprising at least a header portion and a payload portion;

determining at the gateway system an identity of an application outside of the SP computer system transmitting the received message using identity information contained in the header portion that has already been established within the gateway system;

receiving, from the target service system, signature information configured to be used in the creation of a digital signature, the target system within the SP computer system;

digitally signing the identity information wherein signature information used in the digital signature is pre-established with the target service system;

pairing the identity information and the corresponding digital signature in a header of a request message to be transmitted from the gateway system to the target service system;

receiving by the target service system the request message and extracting the identity information and corresponding digital signature from the header;

validating by the target service system the corresponding digital signature; and for signatures that are successfully validated, constructing using the corresponding identity information a data structure that represents the original identity established in the gateway system.

20. A method in accordance with claim 19, wherein receiving a message defining an API service request comprises receiving an HTTP message defining an API service request.

21. A method in accordance with claim 19, wherein pairing the identity information and the corresponding signature in a header of a request message to be transmitted from the gateway system to the target service system comprises pairing the identity information and the corresponding signature in a header of a request message wherein a name of the request message header is pre-established with the target service system.

22. A method in accordance with claim 19, further comprising determining that the received message has not been tampered with.

23. One or more computer-readable non-transitory media comprising a computer-executable program that instructs at least one processor to propagate a client identity included in a service call from a first service system to a target service system for an Application Programming Interface (API) service application stored within a service provider (SP) computer system through an open API platform, said computer-executable program comprising at least one code segment that instructs the at least one processor to:

receive, from the first service system from an entity outside of the SP computer system, a message defining an API service request comprising at least a header portion and a payload portion;

determine at the first service system an identity of an application outside of the SP computer system transmitting the received API service request message using identity information contained in the header portion that has already been established within the first service system;

receive, from the target service system, signature information configured to be used in the creation of a digital signature, the target system within the SP computer system;

digitally sign the identity information wherein signature information used in the digital signature is pre-established with the target service system;

pair the identity information and the corresponding digital signature in a header of a request message to be transmitted from the first service system to the target service system;

receive by the target service system the API service request message and extract the identity information and corresponding digital signature from the header;

validate by the target service system the corresponding digital signature; and for signatures that are successfully validated, construct using the corresponding identity information a data structure that represents the original identity established in the first service system.

24. A computer-readable non-transitory media in accordance with claim 23, wherein the received message comprises an HTTP message defining the API service request.

25. A computer-readable non-transitory media in accordance with claim 23, wherein the identity represents at least one of an entity responsible to the SP computer system for the application, a merchant, and an application user.

26. A computer-readable non-transitory media in accordance with claim 23, wherein the at least one code segment instructs the at least one processor to pair the identity information and the corresponding signature in a header of the request message wherein a name of the request message header is pre-established with the target service system.

27. A computer-readable non-transitory media in accordance with claim 23, wherein the at least one code segment instructs the at least one processor to determine that the received message has not been tampered with.

28. A computer-readable non-transitory media in accordance with claim 23, wherein information used in the digital signature comprises a certificate pre-established with the target service system.

29. A computer-readable non-transitory media in accordance with claim 23, wherein information used in the digital signature comprises profile information related to the identified entity.

30. A computer-readable non-transitory media in accordance with claim 29, wherein the profile information related to the identified entity comprises application user profile information.

31. A computer-readable non-transitory media in accordance with claim 29, wherein the profile information related to the identified entity comprises application developer profile information.

32. A computer-readable non-transitory media in accordance with claim 29, wherein the profile information related to the identified entity comprises merchant profile information.

* * * * *